United States Patent [19]

Satomi

[11] 4,415,259
[45] Nov. 15, 1983

[54] VARIABLE MAGNIFICATION AND RECIPROCAL EXPOSURE COPYING METHOD

[75] Inventor: Toyokazu Satomi, Yokohama, Japan
[73] Assignee: Ricoh Company, Ltd., Japan
[21] Appl. No.: 294,141
[22] Filed: Aug. 19, 1981

[30] Foreign Application Priority Data

Feb. 8, 1980 [JP] Japan ................................. 55-114541

[51] Int. Cl.³ ............................................. G03G 15/00
[52] U.S. Cl. ......................................... 355/11; 355/8; 355/55; 355/60
[58] Field of Search ................. 355/11, 55, 56, 57, 355/60, 65, 66, 77, 8

[56] References Cited

U.S. PATENT DOCUMENTS

| | | | |
|---|---|---|---|
| 3,994,580 | 11/1976 | Hoffman | 355/11 X |
| 4,116,561 | 9/1978 | Knechtel et al. | 355/8 X |
| 4,118,118 | 10/1978 | Barto | 355/11 X |
| 4,139,298 | 2/1979 | Tani | 355/11 X |
| 4,279,497 | 7/1981 | Satomi | 355/11 X |

Primary Examiner—R. L. Moses
Attorney, Agent, or Firm—Guy W. Shoup; Gerard F. Dunne

[57] ABSTRACT

A variable magnification and reciprocal exposure copying method in which the image of an original is introduced onto a photoconductor which is moved in a predetermined direction by reciprocating mirrors relative to the original, so that the photoconductor is exposed to the light image of the original during the forward movement and backward movement, and an auxiliary lens for variable magnification is disposed in such a manner that it can be shifted from or into the optical path in front of or behind an inverted optical system for use in the forward movement or an erecting optical system for use in the backward movement, so that reciprocal, variable magnification copying can be performed. The inverted optical system can be shifted in such a direction as to cross the optical axis thereof, and by the shifting of the inverted optical system, even if a copy sheet smaller than the maximum copying size is used and copying is performed under reciprocal exposure copying or reciprocal magnification copying or both at the same time, images to be copied can be copied within the small copy sheet.

20 Claims, 6 Drawing Figures

VARIABLE MAGNIFICATION AND RECIPROCAL EXPOSURE COPYING METHOD

BACKGROUND OF THE INVENTION

The present invention relates to a variable magnification and reciprocal exposure copying method.

The shortcomings of a conventional variable magnification and reciprocal exposure copying method are as follows:

(1) Many examples of a copying method in which exposure of an original along successive transverse areas is performed by scanning in both directions are known, and typically a photoconductor is moved in a predetermined direction, while an original is moved relative to an optical system, such as a combined lens and mirror system, so as to project a light image of the original on the photoconductor. In most of the known examples, an optical system is provided having an inverting optical system and an erecting optical system, and these systems can be switched, in particular, by changing the position of the optical systems or with the rotation thereof. When the direction of scanning is changed an object of such reciprocal exposure devices is to increase the copying efficiency. However, in practice, it is extremely difficult to change the positions of the optical systems within the short time between the forward movement and backward movement of the optical system and still maintain the mechanical accuracy of the optical systems. Therefore, such optical systems have not been used in practice.

(2) Another conventional technique is disclosed in Japanese laid-open patent application no. 54-70047, in which an in-mirror lens and an in-prism lens are disposed back to back, and scanning is performed by mirrors which are moved with a speed ratio of $1:\frac{1}{2}$, whereby exposure can be performed during the course of both the forward movement and the backward movement of the mirrors. A further conventional technique is disclosed in Japanese laid-open patent application no. 54-98251, in which two in-mirror lenses are disposed back to back, and scanning is performed with mirrors which are moved with a speed ratio of $1:\frac{1}{2}$, whereby exposure can be performed during the course of both the forward movement and the backward movement of the mirrors. These techniques utilize two optical systems, i.e. an erecting optical system and inverting optical system, and their optical paths are switched one to the other by use of a shutter or the like. However, these devices are not used for variable copying magnification and therefore they can be further improved for practical use as a copying system.

(3) A still further conventional technique is disclosed in U.S. Pat. No. 4,118,118, which is capable of changing the magnification ratio of the projected image by moving an auxiliary lens relative a stationary in-mirror lens to alter the position of an image mirror. More specifically, the in-mirror lens is held stationary and the auxiliary lens is move toward the in-mirror or moved away therefrom to change the focal distance of the in-mirror lens and at the same time, an image mirror is moved, whereby magnification is varied. In a copying machine using this technique, a reference position for placing an original is predetermined and variable magnification is performed in such a manner that the image position corresponding to that reference position is also set at a predetermined position for practical use. In this copying machine, the lens has to be moved in the direction normal to the optical axis thereof. However, in the specification of the U.S. patent, there is no description about the movement of the lens. Therefore, according to the disclosure of the U.S. patent, one would expect an inconvenience in that the position of the original has to be changed at each magnification.

SUMMARY OF THE INVENTION

An object of the present invention is to provide a variable magnification and reciprocal exposure copying method which is capable of increasing the efficiency of copying performance by reciprocal exposure and performing variable magnification for practical use, from eliminates many of the inconveniences which may be accompanied with known variable magnification systems.

Another object of the present invention is to provide a variable magnification and reciprocal exposure copying method of the type mentioned above, in which copying can be performed by use of a copy sheet smaller than the maximum copying size under reciprocal exposure copying or reciprocal exposure and variable magnification copying or both at the same time, and the images to be copied will be within the small copy sheet.

In order to attain the above-mentioned objects, in the present invention, an auxiliary lens for variable magnification is disposed in such a manner that it can be shifted from the optical path in front of or behind an inverting optical system which is used for exposure at the forward scanning or an erecting optical system which is used for exposure at the backward scanning, and an original side end reference position and a copy sheet side end reference position are each set at predetermined positions, and the inverting optical system can be shifted in the direction normal to the optical system thereof to such a position where the projected image is not deviated from the copy sheet side end reference position and the shifting of the auxiliary lens and the inverted optical system can be done by their respective automatic shifting mechanisms.

DETAILED DESCRIPTION OF THE PREFERRED EMBODIMENTS

An embodiment of the present invention will now be explained.

The key feature of the invention is that in a copying machine in which the image of an original is introduced onto a photoconductor which is moved in a predetermined direction by reciprocating mirrors moving relative to the original so that the photoconductor is exposed to the light image of the original, an auxiliary lens for variable magnification is disposed in such a manner that it can be shifted from the optical path in front of or behind an inverting optical system or an erecting optical system for the purpose of performing variable magnification copying; and a reference position for the lateral side of the original and a reference position for the lateral side of a copy sheet are each set and held at predetermined positions, so that copying can be performed by use of a copy sheet smaller than the maximum copying size under reciprocal exposure copying or reciprocal exposure and variable magnification copying, or both, at the same time by shifting the inverting optical system in the direction normal to the optical system thereof to such a position where the projected image is not deviated from the copy sheet side reference position and by selectively setting the auxiliary lens in front of the erecting optical system and the inverting optical system in accordance with the selected variable magnification.

Figure 1:
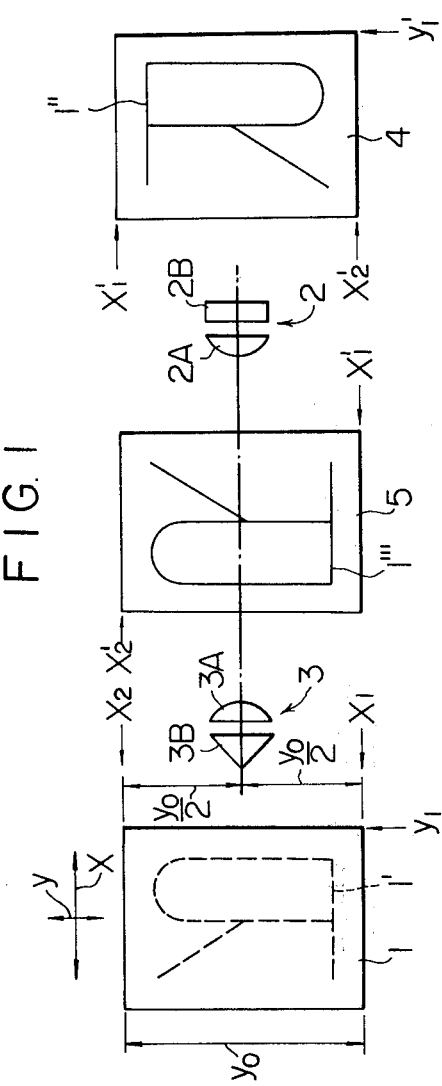
FIG. 1 is a schematic illustration in explanation of image formation by reciprocal exposure when an original of maximum size and a copy sheet of maximum size are employed.
Figure 2:
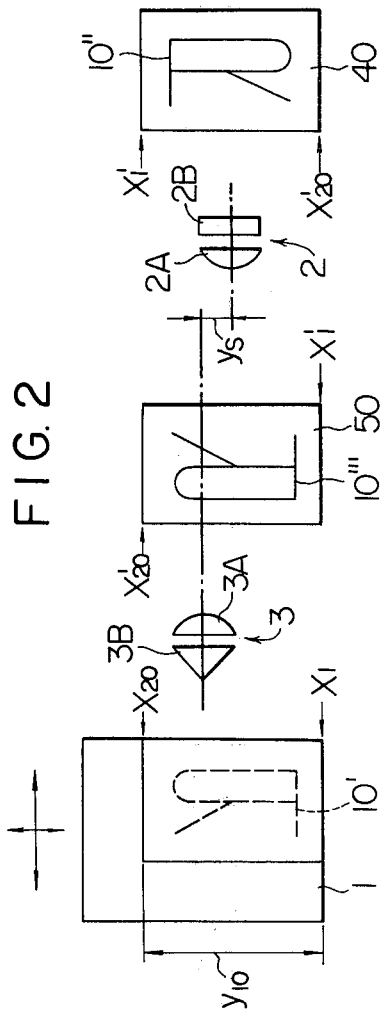
FIG. 2 is a schematic illustration in explanation of image formation by reciprocal exposure when an original of small size and a copy sheet of small size are employed.
Figure 3:
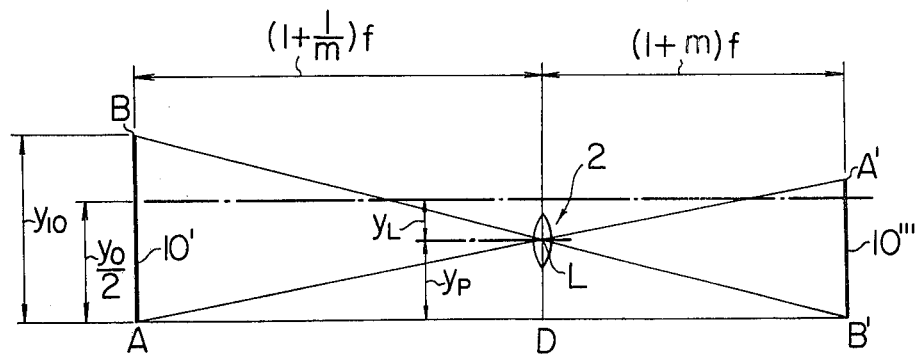
FIG. 3 is a view in explanation of the shift distance of an inverted optical system at a variable magnification.

Referring to FIGS. 1 to 3, the principle of the projection in the invention will now be explained.

Generally, in a reciprocal original scanning system, the original is scanned in opposite directions by forward movement and backward movement of a scanning apparatus, while the moving direction of the surface of a photoconductor does not change. Therefore, for appropriate exposure of the photoconductor, it is required that an in-prism lens (a lens in which a prism is incorporated) or a roof mirror be employed in one of the exposure optical paths to enable both forward scanning and backward scanning.

Referring to FIG. 1, reference numeral 1 indicates a surface, such as a platen of a copying machine, for placing the original thereon, referred to as the original placing surface. The size of the original placing surface 1 is equal to the maximum size of an original expected to be copied, and the original is represented by reference numeral 1'. The direction of arrow x is the transverse direction corresponding to the scanning direction of the original. The direction of the arrow y is the lengthwise direction normal to the scanning direction of the original. The ends of the original placing surface 1 in the lengthwise direction thereof are indicated by symbols $x_1$ and $x_2$. One end of the original placing surface 1 in the transverse direction thereof is indicated by symbol $y_1$. The length of the original placing surface 1 in the lengthwise direction thereof is represented by symbol $y_0$. The position indicated by the symbol $x_1$ corresponds to a reference position for a side of the original. A reference position for a side of the copy sheet is located on the line in the transverse direction thereof which passes through the point $x_1$.

One image formation lens system is disposed in an exposure optical path for forward scanning, which comprises a lens 2A and a mirror 2B and is named an inverting optical system 2.

Another image formation lens system is disposed in an exposure optical path for backward scanning, which comprises a lens 3A and a roof mirror 3B, and is named an erecting optical system 3. The exposure optical path for backward scanning is of a roof type.

It is supposed that the above-mentioned optical systems are located on the line passing through the middle of the width $y_0$, i.e. at the point of $\frac{1}{2}y_0$ of the original placing surface 1 in the lengthwise direction. The original 1', which is equal in size to the maximum size expected, is placed as shown in FIG. 1 with the side $x_1$ and the side $y_1$ being reference positions. In the forward scanning, since the inverting optical system 2 which is disposed in the central portion in the lenghtwise direction, is an in-mirror lens system, in other words, since the exposure optical path is not of a roof type, the lengthwise or y direction of the original on surface 1 is reversed to form an image 1" in the exposure section. More specifically, it is supposed that the magnification of the projection of the image (hereinafter referred to as the magnification) is m. When m=1, point $x_1$ and point $x_2$ respectively form images at points $x'_1$ and $x'_2$. Likewise, point $y_1$ in the transverse direction forms an image at point $y'_1$. Therefore, when a copy sheet 4 having almost the same size as that of the original 1' is transported with one side $x_1$ in the lengthwise direction and one side thereof in the transverse direction in agreement with reference positions, the image of the original 1' agrees with the position of the copying sheet 4, so that the original information is copied correctly on the copying sheet 4.

In the backward scanning, since the erecting optical system 3 which is disposed in the central portion in the lengthwise direction, is an in-mirror lens system, and the exposure optical path is of a roof type, only the transverse direction of the image 1' at the exposure section is reversed, while the lengthwise direction is not reversed. Therefore, a copy sheet 5, which is transported with its portion $x_1$ as the reference position thereof, and the image of the original 1' are not deviated from each other in the lengthwise direction at the recording position, so that copying can be made appropriately.

Two copies, therefore, can be made during the forward and backward scanning of the original, and with originals of maximum size, the images will be positioned correctly on the copy sheet.

When an original is of a size smaller than the maximum size expected with the copying machine, copying of the original is performed as follows: In the case shown in FIG. 2, the magnification m=1, and the length $y_{10}$ of an original 10' in the lengthwise direction is smaller than the width $y_0$ of the original placing surface 1. One side edge of the original 10' is aligned with one edge portion of the original placing surface 1 on the side of the point $x_1$ and another side edge of the original 10' is placed in agreement with a position $x_{20}$ of the original placing surface 1. In the image 10" formed by the erecting optical system 3, points $x_1$ and $x'_1$, and points $x_{20}$ and $x'_{20}$ are respectively caused to lie properly in the lengthwise direction of the copy sheet 50 by the erecting optical system 3.

On the other hand, in the image 10" formed by the inverting optical system 2, the corresponding points are reversed in the lengthwise direction by the inverting optical system 2. Therefore, in order to project the image 10" properly centered along an imaginary median line drawn in the transverse direction of the copy sheet 40, it is required that the inverting optical system 2 be shifted by a predetermined correction distance Ys in the lengthwise direction.

Thus, by setting small size copy sheets 40 and 50 along a reference line in the transverse direction on the side of the point $x_1$ which is the reference position of the original 10', copies free from any deviation can be obtained and the troublesome need to displace a sheet feed cassette or otherwise alter the position of the copy sheets in the exposure section can be completely eliminated.

As mentioned above, the shifting of the inverting optical system is necessary at the time of exposure by the inverting optical system when a small size original is being copied.

If the size of the original is small and a copy sheet of small size corresponding to the original is employed under unit magnification (m=1), it is required that the inverted optical system 2 be shifted by the correction distance Ys. However, when variable magnification is performed, the inverted optical system 2 also has to be shifted in the lengthwise direction.

Referring to FIG. 3, how the shift distance is determined will now be explained.

In FIG. 3, symbol $Y_L$ represents an overall correction distance which contains the above-mentioned correction distance Ys due to the changing of the size of the original and the size of the copy sheet, and a correction distance due to variable magnification. In FIG. 3, the inverting optical system is shown in the form of a single lens 2 in order to simplify illustration.

In the triangles formed by connecting the original 10' and the image 10''' through the center L of the inverting optical system 2 with straight lines, a triangle ABB' and a triangle DLB' are similar in shape. When the magnification is m, and the focal distance of the inverting optical system 2 is f, the object distance is $(1+1/m)f$, while the image distance is $(1+m)f$. The height of the center L of the inverting optical system 2 is indicated by Yp.

Expressed as a formula, the above-mentioned relation between the length $Y_{10}$ of the original 10, the magnification m, the focal distance f and the height Yp is $$\frac{Y_p}{Y_{10}} = \frac{(1+m)f}{(1+m)f + (1+1/m)f} \quad (1)$$

The above expression can be rearranged as follows.

$$Y_p = mY_{10}/(1+m) \quad (2)$$

Further, since Equation (3) holds as can be seen from FIG. 3, Equation (4) can be obtained by substituting Equation (2) into Equation (3) and rearranging Equation (3) as follows:

$$Y_L = (Y_0/2) - Y_p \quad (3)$$

$$Y_L = \frac{Y_0}{2} - \frac{mY_{10}}{1+m} \quad (4)$$

The right shift distance of the inverting optical system 2, that is, the overall correction distance, can be determined by use of Equation (4) by substituting the desired magnification ratio m into Equation (4) since the length $Y_0$ of the original placing surface 1 in the lengthwise direction thereof and the length $Y_{10}$ of the original are known.

For example, when m=1 and $Y_{10}=Y_0$, the following is obtained from Equation (4):

$$Y_L = (Y_0/2) - (Y_0/2) = 0.$$

Likewise, when m=1 and $Y_{10}=Y_0/2$, $$Y_L = (Y_0/2) - \tfrac{1}{2}(Y_0/2) = Y_0/4.$$

Furthermore, when m=0.5 and $Y_{10}=Y_0$, $$Y_L = \frac{Y_0}{2} - \frac{0.5}{1.5} Y_0 = \frac{Y_0}{2} - \frac{Y_0}{3} = \frac{Y_0}{6}$$

Equation (4) expresses the overall correction distance $Y_L$ of the inverting optical system relating to both the size of the original and the magnification when variable magnification and reciprocal exposure are performed as described above.

The operator of the copying machine, therefore, merely has to select the copy sheets of the desired size to match the original. When the desired magnification ratio is selected, the overall correction distance $Y_L$ is determined by Equation (4) and, therefore, the inverting optical system 2 is moved to a position which satisfies the overall correction distance $Y_L$ determined for the particular magnification. This operation can be done automatically in the copying machine.

Figure 4:
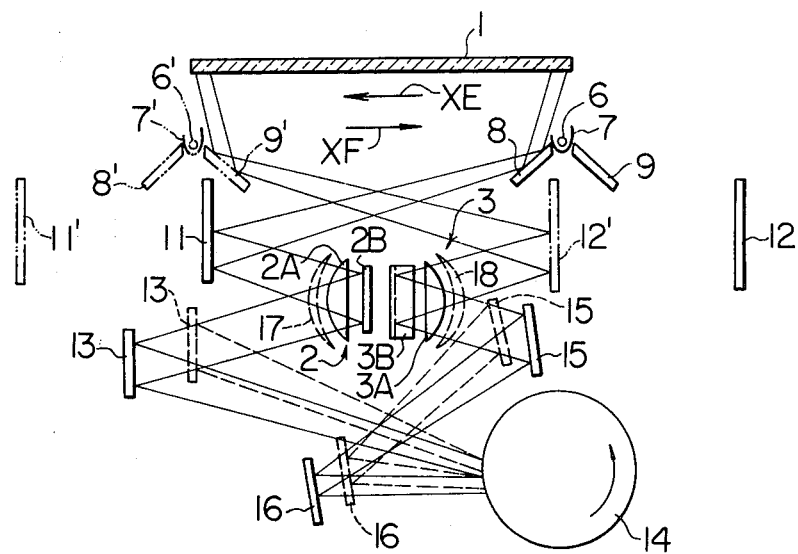
FIGS. 4 and 5 are schematic views in explanation of the construction of the optical system of a variable magnification and reciprocal exposure copying machine for use in the present invention.

Referring to FIG. 4, the construction of an optical system of a variable magnification and reciprocal exposure machine employing the above-described principle will now be explained.

In FIG. 4, a lamp 6, reflector 7, first image inversion movable mirror 8 and first image erecting movable mirror 9 are supported by a first mirror support member (not shown) and are movable in the direction of the arrow $X_E$ (or the arrow $X_F$). Furthermore, a second image inversion movable mirror 11 and second image erecting movable mirror 12 are supported by a second mirror support member (not shown) and are movable at a speed half the speed of the first mirrors 8, 9 in the direction of the arrow $X_E$ (or the arrow $X_F$).

Exposure during the forward scanning by the inverting optical system 2 is performed during the period of time in which the lamp 2, reflector 7, first image inversion movable mirror 8 and first image erecting movable mirror 9 are moved from the positions indicated by the solid lines to the positions indicated by the imaginary lines. Each of the above-mentioned members which are located at the final positions of the forward scanning (which are the starting positions of the members for the backward scanning) is provided with each reference number with a prime.

In the course of the forward scanning, the rays of light are introduced onto the surface of a photoconductor 14 which is rotated in the direction of the arrow, via the first image inversion movable mirror 8, second image inversion movable mirror 11, inverting optical system 2, and image inversion stationary mirror 13, so that he image of an original is formed on the photoconductor 14.

In this example, $X_E$ indicates the forward direction and $X_F$ indicates the backward direction. This is because the right end of the original placing surface 1 is used as the reference position. Therefore, if the left end of the original placing surface 1 is used, the $X_F$ direction is the forward scanning direction while $X_E$ direction is the backward scanning direction. The two optical paths for the forward scanning and the backward scanning are switched by a shutter (not shown) when one of the optical paths is not used for exposure.

When variable magnification is performed, an auxiliary lens 17 for image inversion shown by the broken lines is located in front of the inverting optical system 2 and an auxiliary lens 18 for image erection is located in front of the erecting optical path 3. In order to change the length of the optical path from each lens to be photoconductor 14, stationary mirror 13 for image inversion, stationary mirror 15 for image erection and second stationary mirror 16 for image inversion are moved to the respective positions shown by the broken lines.

A shifting mechanism for shifting a lens when the size of an original is changed or when variable magnification is done (in the direction perpendicular to the surface of FIG. 6) will be explained later by reference to FIG. 6.

Figure 5:
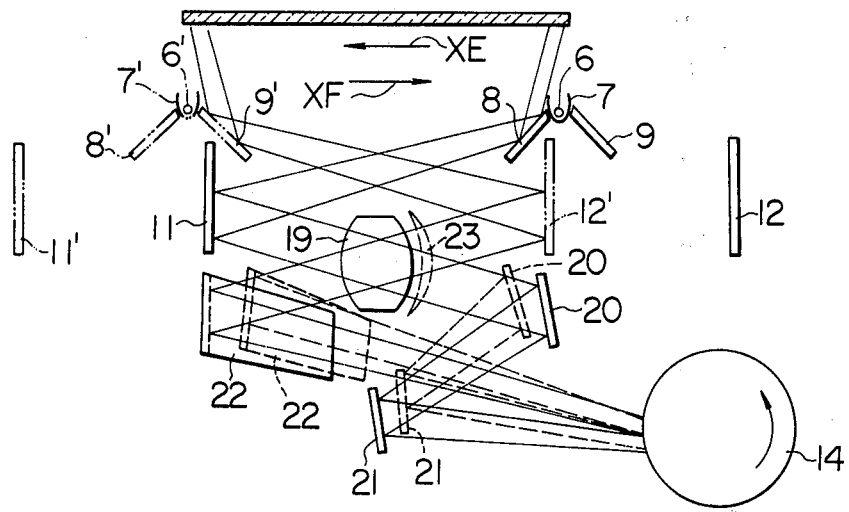

Referring to FIG. 5, the construction of another example of an optical system having variable magnification and reciprocal exposure function will bow be explained.

In FIG. 5, with respect to the members which cannot be confused, the same reference numerals are employed as those in FIG. 4 for convenience of explanation.

Referring to FIG. 5, the construction and function of each of the movable mirrors 8, 9, 11 and 12 are exactly the same as those for the same mirrors shown in FIG. 4. The key feature of the optical system shown in FIG. 5 is that a single lens 19 is used for both image inversion and image erection. Therefore, an inverted image and an erecting image are each formed after the rays of light have passed through the lens 19.

When an inverted image is formed, the rays of light pass through the lens 19 and are then introduced onto the surface of the photoconductor 14 via a first stationary mirror 20 and a second stationary mirror 21.

When an erecting image is formed, the rays of light are reflected by roof mirror 22 and are then introduced onto the surface of the photoconductor 14.

The roof mirror 22 consists of a pair of mirrors constructed in the shape of a letter V with an angle of 90°. The ridgeline of the roof mirror 22 is parallel to the plane of the drawing and the function of the roof mirror 22 is the same as that of the previously mentioned roof prism 3B of the prior art.

When variable magnification exposure is performed by this optical system, an auxiliary lens 23 is disposed near the lens 19 as in the case of the previously described optical system. At the same time, the length of the optical path from the lens 19 to the photoconductor 14 is changed by changing the positions of the first stationary mirror 20, second stationary mirror 21 and roof mirror 22.

The position of each mirror shown by the solid lines is for unit magnification exposure and the position of each mirror shown by broken lines is for variable magnification exposure.

Referring to FIGS. 4 and 5, the angle of rays of light incident upon the photoconductor 14 at unit magnification are illustrated so as to be different from the angle of rays of light incident upon the photoconductor 14 at variable magnification. This difference is only due to the convenience of explanation. There will be no problem when the angle of incidence is 5° or less, although there will be a slight change in the angle of incidence, depending upon the diameter of a photoconductor drum employed and the slit width.

A lens shift mechanism will now be explained by referring to FIG. 6, which lens shift mechanism can be used in the optical system as shown in FIG. 4.

Figure 6:
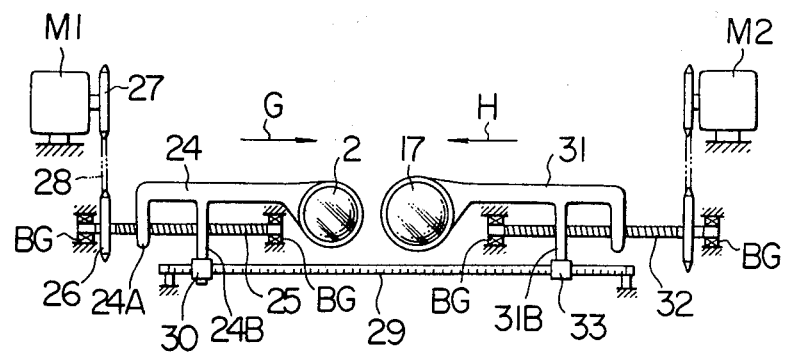
FIG. 6 is a schematic front view of the main portion of a shift mechanism for shifting a lens.

In FIG. 6, the inverting optical system 2 is supported by a lens bracket 24. In the lens bracket 24, there are formed two leg portions 24A and 24B. The leg portions 24A, 24B are supported by a screw shaft 25 which is screwed into the two leg portions 24A, 24B. The opposte end portions of the screw shaft 25 are supported by fixed members through bearings BG. A sprocket 26 is fixed to the screw shaft 25 on the outside of the leg portion 24A. The sprocket 26 is disposed, towards a sprocket 27 of a first motor M1, and a timing belt 28 is trained over the sprockets 26 and 27.

The leg portion 24B of the lens bracket 24 is formed so as to be slightly longer than the leg portion 24A. A position scale 29 slidably passes through the lower portion of the leg portion 24B, and a scale reading apparatus 30 is disposed at the slidably passing portion in the leg portion 24B. When the screw shaft 25 is rotated by the first motor M1, the lens bracket 24 is moved in a direction G or in a direction H in accordance with the direction of rotation of the motor M1 and movement of the lens bracket 24 can be stopped by the position scale 29. The scale reading apparatus 30 reads the movement corresponding to a predetermined overall correction distance $Y_L$, and controls the energizing and deenergizing (i.e., on and off) of the first motor M1.

The structure of the peripheral portion of an auxiliary lens bracket 31 which supports the auxiliary lens 17 for image inversion is exactly the same as the structure of the peripheral portion of the lens bracket 24, and as a screw shaft 32 is rotated by the rotation of a second motor M2, the auxiliary lens bracket 31 is moved in the direction G or H. The on-off control of the second motor M2 is performed in accordance with a detection signal generated when a reading apparatus 33 reads the position scale 29 which passes through a leg portion 31B of the auxiliary lens bracket 31.

The inverting optical system 2 is moved in accordance with the original size (indication of the selection of a copy sheet) and the indication of variable magnification. The auxiliary lens 17 is moved only when variable magnification is performed and at that time, the optical axes of the lens of the inverting optical system 2 and auxiliary lens 17 are caused to coincide with each other.

The lens shift mechanism shown in FIG. 6 can be applied to the optical system as shown in FIG. 5. When the lens shift mechanism shown in FIG. 6 is applied to the optical system as shown in FIG. 5, the lens 19 is moved to such a position which is determined by the original size or the magnification when the lens 9 is used as the inverting optical system. At the same time, it is required that the roof mirror 22 be moved in the same direction and by the same distance as the moving direction, and the moving distance of the lens 19 and the ridgeline of the roof mirror 22 coincide with the optical axis of the lens 19. This is because the reference position of the original and the reference position of the image are on the same side, regardless of the position of the erecting optical system when the lens 19 is used as erecting optical system.

As an alternative example, a shift mechanism can be employed, in which the inverting optical system 2 is employed instead of the erecting optical system 3 in FIG. 4, that is, two identical optical systems are employed and the roof mirror 22 as shown in FIG. 5 is disposed in the optical path of an erecting image between the lens and the photoconductor 14.

According to the present invention, variable magnification and recicprocal exposure can be performed extremely effectively.

What is claimed is:

1. In a copying machine having scanning means adapted to be reciprocated back and forth relative an original for producing a light image of the original and directing said light image to a photoconductor through an inverting optical system during movement of said scanning means in one direction, and directing said light image to said photoconductor through an erecting optical system during movement of said scanning means in the other direction, means including an auxiliary lens movable along the optic path extending from the said original, through each said lens system and to said photoconductor for varying the magnification of the image directed to said photoconductor, and means for guiding a transfer sheet into engagement with said photoconductor by aligning a side edge of said transfer sheet with a reference position; the improvement including means associated with the movement of said auxiliary lens for shifting the inverting optical system in a direction normal to the optic axis thereof to shift the projected image on the photoconductor so that the image will be centered on the transfer sheet brought into engagement with said photoconductor.

2. A machining according to claim 1, said shifting of said inverting optical system corresponding to a change in the size of the original and the movement of said auxiliary lens.

3. A machine according to claim 1, said photoconductor being an intermediate recording medium.

4. A machine according to claim 1, said photoconductor being a final recording medium.

5. A machine according to claim 1, including means moving said photoconductor synchronously with the movement of said scanning means continuously in the same direction regardless of the direction of movement of said scanning means.

6. A machine according to claim 1, said inverting optical system and said auxiliary lens being moved by a common shift mechanism comprising a bracket movable integrally with said inverting optical system, and a second bracket movable integrally with said auxiliary lens, screw shafts threaded into said brackets, and means for stopping rotation of said screw shafts.

7. A machine according to claim 6, said screw shafts each being connected to a respective motor.

8. A machine according to claim 6, said rotation stopping means comprising a scale with graduations disposed parallel to said screw shafts, a leg portion of each said bracket slidably fitted on said scale, and means attached to said leg portions of said brackets for reading said scale.

9. A machine according to claim 8, said scale-reading means including means reading a predetermined distance from said scale for controlling the rotation of said motors driving said screw shafts.

10. A machine according to claim 1, the optical path including said inverting optical system being formed by a path traveling from the original, a first mirror movable for image inversion, a second movable mirror for image inversion, the inverting optical system, a stationary mirror for image inversion, and the inverting optical system, a stationary mirror for image and said photoconductor; and the optical path including said erecting optical system being formed by a path traveling from said original, a first movable mirror for image erection, a second movable mirror for image erection, a first stationary mirror for image erection, a second stationary mirror for image erection and said photoconductor, said auxiliary lens for variable magnification being inserted near one of said inverted optical system and said erecting optic system, and the length of the optical path from said inverting optical system to said photoconductor being changable by movement of said stationary mirror for image inversion, and the length of the optical path from said erecting optical system to said photoconductor being changable by changing selectively the positions of said first stationary mirror for image erection and said second stationary mirror for image erection.

11. A machine according to claim 10, said inverting optical system comprising a lens and a mirror, and said erecting optical system comprising a lens and a roof mirror.

12. A machine according to claim 10, said first movable mirror for image inversion and said first movable mirror for image erection being supported by a support member and are movable integrally, and said second movable mirror for image inversion and said second movable mirror for image erection being supported by a second support member and are movable integrally and, during the movement thereof, said second movable mirrors are moved at a speed half the speed of said first movable mirrors.

13. A machine according to claim 10, means including a shutter inserted in each optical path for switching between each optical path as the forward exposure and the backward exposure is performed by said scanning means.

14. A machine according to claim 1, the optical path including said inverting optical system being formed by a path traveling from the original, a second movable mirror for image inversion, a lens, a first stationary mirror, a second stationary mirror and said phtoconductor; and said optical path including said erecting optical system being formed by a path traveling from said original, a first movable mirror for image erection, a second movable mirror for image erection, said lens, a roof mirror, and said photoconductor, said auxiliary lens for variable magnification being inserted near said lens and the length of the optical path from said lens to said to said photoconductor during image inversion being changed by movement of said first stationary mirror and by changing the positions of said first stationary mirror, said second stationary mirror and said roof mirror during image erection.

15. A machine according to claim 14, means including a shutter inserted in each optical path for switching between each optical path as the forward exposure and the backward exposure is performed by said scanning means.

16. A machine according to claim 14, said first movable mirror for image inversion and said first movable mirror for image erection being supported by a support member and are movable integrally, said second movable mirror for image inversion and said second movable mirror for image erection being supported by a second support member and are movable integrally and, during the movement thereof, said second movable mirrors are moved at a speed half the speed of said first movable mirrors.

17. A machine according to claim 14, said lens, said roof mirror and said auxiliary lens being shiftable in a direction normal to the optical axis thereof by respective shift mechanisms each having an identical structure, said shift mechanisms each comprising a bracket integral with the respective member to be shifted, screw shafts screwed into said brackets, and rotation stop means for stopping rotation of said bracket.

18. A machine according to claim 17, said rotation stopping means comprising a scale with graduations disposed parallel to said screw shafts, a leg portion of each of said brackets slidably fitted on said scale, and means attached to said leg portions of said brackets for reading said scale.

19. A machine according to claim 17, said scale-reading means including means reading a predetermined distance from said scale for controlling the rotation of said motors driving said screw shafts.

20. A machine according to claim 10, said erecting optical system having the same construction as said inverting optical system but having a roof mirror disposed in the optical path between said lens and said photoconductor for erecting an image.

* * * * *